United States Patent
Louette et al.

(10) Patent No.: US 9,618,926 B1
(45) Date of Patent: Apr. 11, 2017

(54) INTELLIGENT ENGINE FOR MANAGING OPERATIONS FOR A COMPUTER NUMERICAL CONTROL (CNC) MACHINE IN A COMPUTER-AIDED MANUFACTURING (CAM) SYSTEM

(71) Applicant: D.P. Technology Corp., Camarillo, CA (US)

(72) Inventors: Dominique Louette, Camarillo, CA (US); Olivier Thenoz, Camarillo, CA (US)

(73) Assignee: D. P. TECHNOLOGY, CORP., Camarillo, CA (US)

( * ) Notice: Subject to any disclaimer, the term of this patent is extended or adjusted under 35 U.S.C. 154(b) by 563 days.

(21) Appl. No.: 14/027,076

(22) Filed: Sep. 13, 2013

(51) Int. Cl.
*G05B 19/18* (2006.01)

(52) U.S. Cl.
CPC .................................. *G05B 19/18* (2013.01)

(58) Field of Classification Search
CPC ...................................................... G05B 19/18
See application file for complete search history.

(56) References Cited

U.S. PATENT DOCUMENTS

| | | | | |
|---|---|---|---|---|
| 4,149,235 A * | 4/1979 | Froyd | ................... | G05B 19/05 700/169 |
| 4,719,579 A * | 1/1988 | Niwa | ................... | G05B 19/408 318/561 |
| 6,112,133 A * | 8/2000 | Fishman | .......... | G05B 19/40937 700/180 |
| 6,470,377 B1 * | 10/2002 | Sevcik | ................... | H04L 29/06 700/181 |
| 6,510,361 B1 * | 1/2003 | Govindaraj | ........ | G05B 19/4145 700/169 |
| 7,099,738 B2 * | 8/2006 | Ikeda | ................. | G05B 19/4097 700/182 |
| 7,117,056 B2 * | 10/2006 | Balic | ................. | G05B 19/4099 700/104 |
| 8,195,310 B2 * | 6/2012 | Ould | ................... | G05B 19/401 700/17 |
| 2006/0058907 A1 * | 3/2006 | Suderman | .......... | G05B 19/4093 700/184 |
| 2011/0153297 A1 * | 6/2011 | Keibel | .................... | A61N 5/10 703/7 |
| 2013/0338807 A1 * | 12/2013 | De Schepper | ..... | G05B 19/4097 700/96 |

\* cited by examiner

*Primary Examiner* — Kenneth M Lo
*Assistant Examiner* — David Wynne
(74) *Attorney, Agent, or Firm* — Brooks Acordia IP Law, P.C.; Pejman Yedidsion

(57) ABSTRACT

Methods, systems, and devices for determining a machining process in a CAM system where the determining is based on CNC machine capabilities, user defined process constraints, and CNC machine configurations.

20 Claims, 10 Drawing Sheets

| Workpiece Scenario | Picture |
|---|---|
| Workpiece = 1 Part + 1 Stock |  |
| Workpiece = 2 instances of same part + 1 Stock |  |
| Workpiece = 2 different parts + 1 Stock |  |
| Workpiece = 1 Part + 2 Stocks |  |

INTELLIGENT ENGINE FOR MANAGING OPERATIONS FOR A COMPUTER NUMERICAL CONTROL (CNC) MACHINE IN A COMPUTER-AIDED MANUFACTURING (CAM) SYSTEM

TECHNICAL FIELD

The invention in its several embodiments relates generally to management of data necessary for generation of machining processes in a computer aided manufacturing (CAM) system.

BACKGROUND

Computer aided manufacturing (CAM) software systems are used to program computer numerical control (CNC) machine tools that are used in machine shops for the production of discrete parts such as molds, dies, tools, prototypes, aerospace components and more. CAM systems start from a geometric model. On the geometric model, the system recognizes machining features. A machining feature is an elementary geometric shape characterized with machining properties. The end-user specifies, with assistance and guidance of the CAM system, machining strategies to apply on the machining features.

The application of the machining strategies generates machining operations that perform material removal on a workpiece, where the workpiece may be the association of a part and a stock. Operations contain a tool path that describes the trajectory of the tool on the workpiece. From a sequence of operations, the CAM system interprets and translates the data to generate a numerical control (NC) program. The NC program is a list of executable commands that CNC machines can understand and execute.

SUMMARY

A numerical control (NC) program may need to be efficient to maximize the production of the computer numerical control (CNC) machine. In one embodiment, the following programming scenarios are examples of methods to maximize the machine production: (a) the machine may cut several parts at a time inside the same program; (b) workpieces, at different stages of their process, may be mounted and cut at the same time, where each time the program runs, the machine completes at least one workpiece; (c) the program may start from a bar stock and cut parts from the bar stock in a series; (d) the program may command a machine that may command multiple tools simultaneously, where such a machine may be called a multi-channel machine; and (e) the program may command a machine with a wide range of machining capabilities, where such a machine may be called a multi-tasking machine.

These complex scenarios are commonly combined in the same program. Operation of such CAM systems may require the following: (1) ensure an operation is compatible with the machine; (2) be able to handle complex programming with a lot of data and many user interactions; (3) be able to verify a complex program, where the verification is not necessarily after programming; (4) perform programming based on complete knowledge of the machine, where the operations need information for proper conversion to an NC program; and (5) adapt to program changes such as machine changes, setup changes, and/or machining process changes.

One embodiment of the disclosed CAM system comprises a program manager computing device where the program manager may generate operations optimized for a CNC machine presenting two points of view of the machine program: (1) the part view for programming where the part view is clear, easy to understand, and simple to edit; and (2) the machine view representing the machine program, reflecting closely what is happening on the machine. The program manager may automatically generate the machine view side of the program and is responsible for processing the machining strategies using the machine capabilities. The program manager may be responsible for tracking and tracing workpieces when the setup changes in the program. The program manager may further perform a synchronization of channels where it may notify the other components of the system when to recalculate the transition movement and when to perform intermediate stock regeneration.

The program manager may use a representation of the data of the program and may offer the flexibility to change the machine or the workpiece setup at any point while programming and with no loss of data. The program manager brings a higher level of automation during the programming. It optimizes the machining sequence for different machining scenarios and simplifies the programming of complex machines.

Embodiments may include a method of determining a sequence of machine operations in the CNC machine, where the method may comprise: determining a part operation in a computer-aided manufacturing (CAM) system, where the part operation comprises a toolpath associated with a part of a workpiece and where the part operation may be configured for a computer numerical control (CNC) machine; inserting the part operation in a part operation list, where the part operation list specifies a sequence of operations occurring on a part; determining a machine operation for each part occurrence of a set of part occurrences mounted on the machine, where the determining of the machine operation may be based on a set of motion capabilities of the CNC machine, a position of the part occurrence, and the associated part operation; performing a capability check for each determined machine operation, where the capability check comprises determining whether a machine tool may be capable of performing all motions associated with the toolpath of the determined part operation; and determining a sequence of machine operations in the CNC machine based on the part operation list and whether the machine tool may be capable of performing the machine operation.

Some exemplary embodiments of the method may further comprise: inserting the sequence of machine operations in a CNC machine program; and synchronizing a set of machine program channels based on the sequence of part operations in the part operation list. In some exemplary embodiments of the method, the synchronizing prevents incompatible simultaneous machine operations from occurring on the CNC machine. In some exemplary embodiments of the method, the determining a sequence of machine operations may be further based on a set of rule constraints where the set of rule constraints may be a set of optimization rules. Additionally, in some exemplary embodiments of the method, the set of optimization rules may be at least one of: a set of rules to minimize tool changes, a set of rules to minimize axis rotations, and a set of rules to minimize tool travel.

Optionally, in one exemplary embodiments of the method, the CNC machine program comprises at least one of: machine operations, tool changes, links, and synchronizations. In addition, inserting the part operation in the part operation list may be inserted at a user specified location or where inserting machine operations in the CNC machine program is based on a successful calculation of a toolpath. In some exemplary embodiments of the method, the kinematic chain associated with the CNC machine tool defines possible motions of the machine. In other exemplary embodiments of the method, determining a position and a number of instances of a set of part operations scheduled to occur on the CNC machine based on the part of the workpiece. Optionally, in some exemplary embodiments of the method, the determining whether a machine tool may be capable of performing all necessary motions for the toolpath of the determined part operation may be based on whether axes of a kinematic chain may be capable of performing all motions associated with the toolpath of the determined part operation.

Embodiments may also include a device comprising: a processor and addressable memory, the processor configured to: determine a part operation in a computer-aided manufacturing (CAM) system, where the part operation comprises a toolpath associated with a part of a workpiece and where the part operation may be configured for a computer numerical control (CNC) machine; insert the part operation in a part operation list, where the part operation list specifies a sequence of operations occurring on a part; determine a machine operation for each part occurrence of a set of part occurrences mounted on the machine, where the determining of the machine operation may be based on a set of motion capabilities of the CNC machine, a position of the part occurrence, and the associated part operation; perform a capability check for each determined machine operation, where the capability check comprises determining whether a machine tool may be capable of performing all motions associated with the toolpath of the determined part operation; and determine a sequence of machine operations in the CNC machine based on the part operation list and whether the machine tool may be capable of performing the machine operation.

In some exemplary embodiments of the device, the processing module may be further configured to: insert the sequence of machine operations in a CNC machine program; and synchronize a set of machine program channels based on the sequence of part operations in the part operation list, where the synchronization prevents incompatible simultaneous machine operations from occurring on the CNC machine. In some exemplary embodiments of the device, the processor may be further configured to: determine a position and a number of instances of a set of part operations scheduled to occur on the CNC machine based on the part of the workpiece. Optionally, the determination of a sequence of machine operations may be further based on a set of rule constraints where the set of rule constraints may be a set of optimization rules and where the set of optimization rules may be at least one of: a set of rules to minimize tool changes, a set of rules to minimize axis rotations, and a set of rules to minimize tool travel.

BRIEF DESCRIPTION OF DRAWINGS

Embodiments may be illustrated by way of example and not limitation in the figures of the accompanying drawings, and in which.

DETAILED DESCRIPTION

Figure 1A:
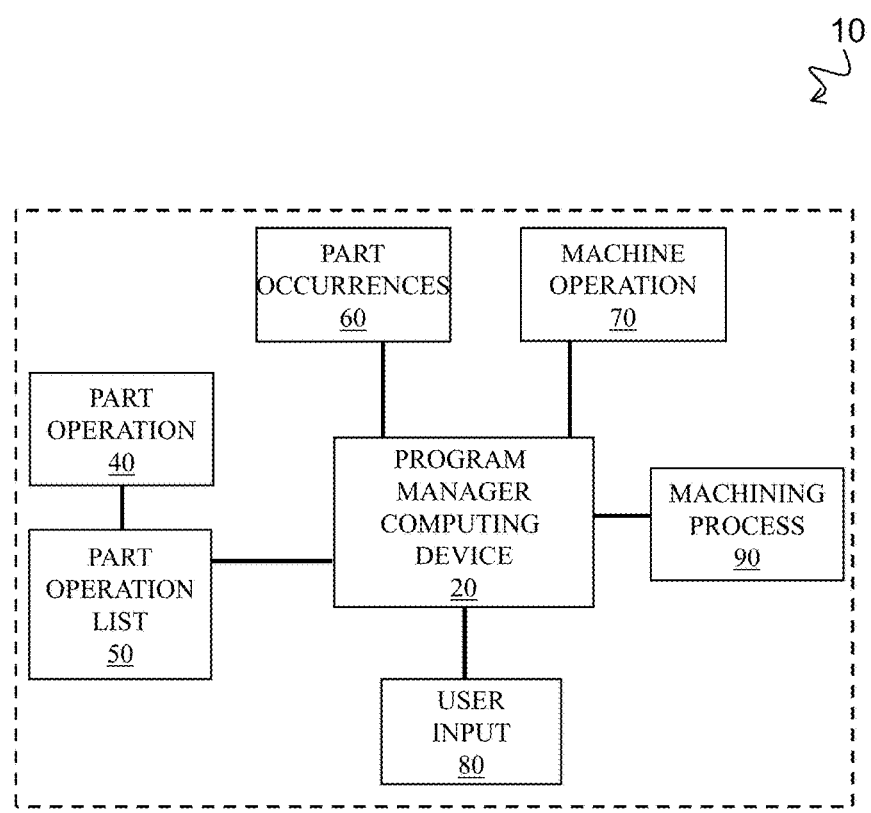
FIG. 1A depicts, in a functional block diagram, an exemplary embodiment of the CAM system comprising a program manager component.

FIG. 1A depicts in a functional block diagram, an embodiment of the Computer-aided manufacturing (CAM) system 10, where the system comprises a program manager computing device 20, which may determine a part operation 40 associated with a computer numerical control (CNC) machine tool. The part operation 40 may be inserted into a part operation list 50 that specifies a sequence of operations occurring on a part. The program manager 20 may then determine a set of part occurrences 60 for the CNC machine where the part occurrences 60 may be based on a workpiece instance and a part instance inside the workpiece. The CAM system 10 may then determine a machine operation 70 for each part occurrence of the set of part occurrences 60, where the determining of the machine operation 70 may be based on a kinematic chain associated with the CNC machine. The program manager 20 may then perform a capability check for the machine operation 70 associated with each part occurrence of the set of part occurrences 60, where the capability check may determine whether an axes of a kinematic chain associated with the machine tool is capable of performing all the motions for the toolpath of the determined part operation. The program manager 20 may then determine a machining process 90 for the CNC machine of the CAM system 10 based on whether the machine tool is capable of performing the determined part operation 40 and the determined machine operation 70. Optionally, the program manager may take as user input 80 the part operations 40.

Exemplary embodiments of the CAM computing systems may include an engine for the management of machining operations in the CAM software system. In some embodiments, the machining operations may be created in two exemplary steps. The first step is the creation of the part operation, where the part operation describes the machining process step on the workpiece but is not specific to a mounted workpiece on the machine. The part operation may not have any spatial or time localization in the machine program and may comprise logical objects. The order of the part operations in the part program is the order of operations that have to occur on all instances of the part that are mounted on the machine. The second step is the generation of the machine operations. The user may program a part operation and a program manager computing device may automatically generate the machine operations. Machine operations may represent the actual machining operations, as they will occur on the machine. Machine operations have a time and spatial localization on the machine. Between machine operations, the program manager may automatically insert tool change events and links when needed. A tool change event may comprise positioning the tool to a location in order to change the active tool. In one embodiment, links, i.e., positioning movements, may comprise the transition moves necessary to connect operations and tool changes.

In one embodiment, during the creation of the operations, the program manager may check the setup of the part and of the machine, together referred to as setups. The setups are a critical piece of the program manager in order for the system to make the best decisions. The setups may define the workpieces, the machine, and the machine configuration. The setups define, for example, on which machine, where, and how the workpieces are mounted. The exemplary program manager may inquire about the capabilities available to the machine and may also guarantee the validity of the machining operation. In the part setup, the user may define the part to cut and the stock in which the part will be cut. The association of the part and stock may be referred to as the workpiece. In the machine setup, the user may mount instances of the workpiece on the machine. Mounting multiple instances of the workpiece does not change the programming for the user. In one embodiment of the program manager, the user may program a single part and the program manager may then generate a program for cutting multiple parts simultaneously.

Typically, parts cannot be cut with one setup. For example, a part may be clamped on the stock surface and machining cannot happen in the clamping zones due to interferences. In such scenarios, subsequent setups may re-clamp the part on different zones in order to complete the machining process. On the machine, all clamping may happen at the start of the program. In another scenario, multiple workpieces may be mounted, however only a portion of the part machining process may occur on each individual workpiece setup. In this scenario, the program manager may create the workpiece generation. The workpiece generation may define which section of the part program occurs on the workpiece. In one scenario, the workpiece may be split within the program and the program manager may handle the workpiece split with the introduction of new setups and new workpieces.

For machines that accept more than one flow of instructions in parallel, the program manager may automatically insert synchronization events. In one embodiment, a flow of instructions is a channel where synchronizations are wait codes across the channels. That is, the program execution pauses until all channels have reached the same wait code. Synchronizations may be important in preventing invalid machining scenarios. This is because two operations may not command the same axis with contradictory instructions. Accordingly, synchronizations may be necessary to adhere to the part machining process.

Figure 1B:
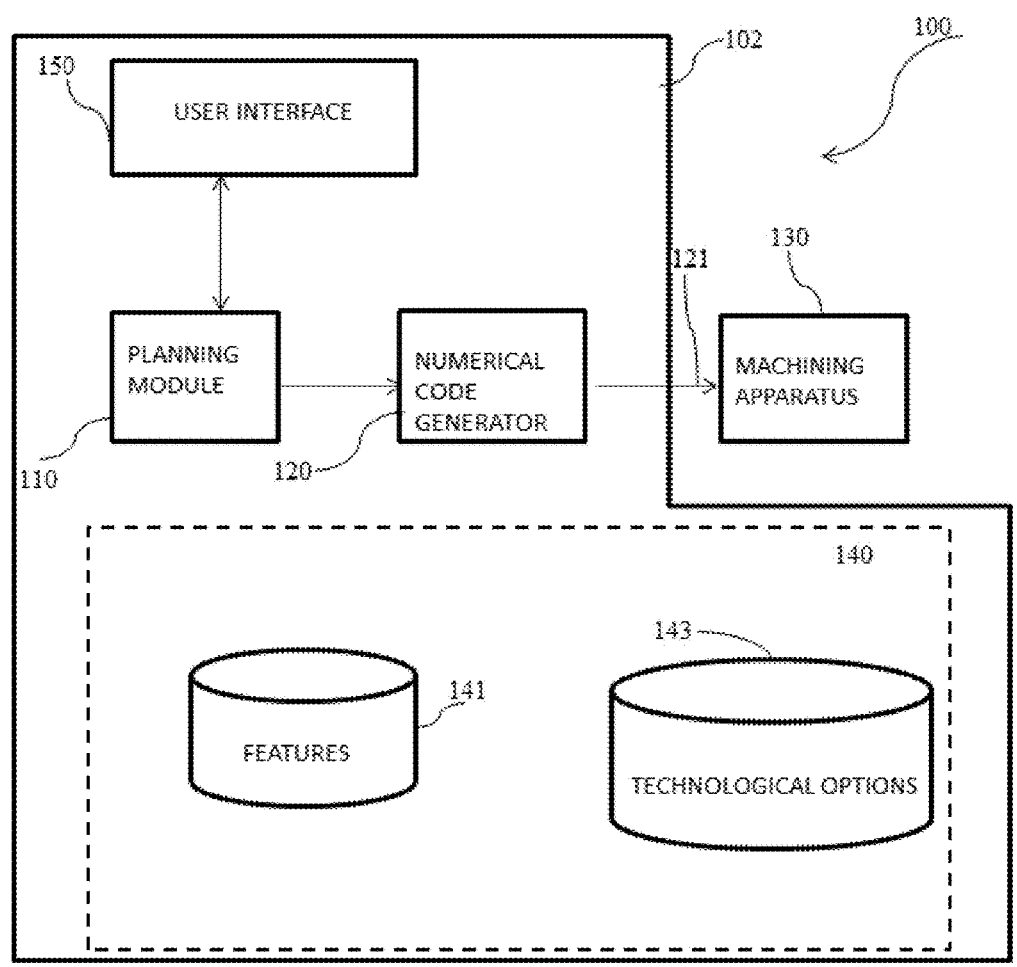
FIG. 1B depicts, in a functional block diagram, another exemplary embodiment of the CAM system.

The invention in its several embodiments may include a CAM system, as illustrated in a functional block diagram in FIG. 1B, where the CAM system 100 may comprise a machining apparatus 130; and a computing device 102, the device comprising: a planning module 110; and a numerical code generator 120. The planning module 110 may further comprise a processing module and the numerical code generator 120 may also further comprise a processing module, where the processing module may comprise (a) a processor and (b) addressable memory. Numerically controlled machines are automatically operated by commands received by their processing units. The machining apparatus 130 may provide a machining tool or cutting tool and may reorient the cutting tool relative to a workpiece according to instructions provided by the numerical code generator 120. The numerical code generator may be responsive to the output of the planning module 110.

The planning module may have access to one or more databases 140 comprising computer-based models of: (a) features defining shapes of workpiece that are to be machined 141; and technological options 143 expressing machining strategy. Additionally, via a user interface 150, a user of the CAM system 100 may select files or objects from the databases 140 for application by the planning module 110 and to generate the numerical code 121 that may, for example, be G-code. The machining apparatus 130 may then receive the G-code and execute the coded instructions to drive the machine tool. The invention in its several embodiments may include an exemplary method to manage the successive machining steps inside the planning module 110.

Figure 2:
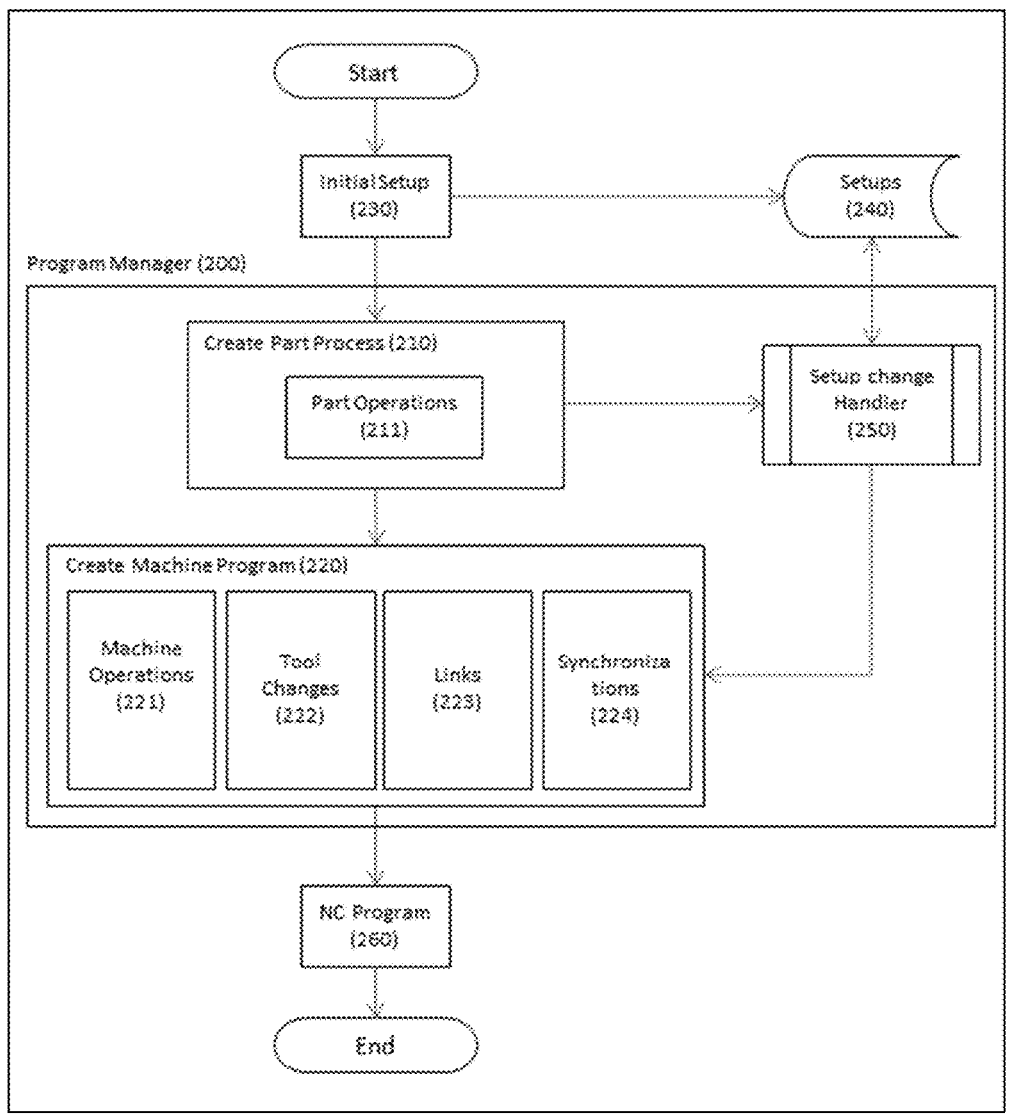
FIG. 2 depicts, in a top-level flowchart, an exemplary method of the creation of the machine program by the program manager computing device.

FIG. 2 depicts an exemplary flowchart of the process for the creation of the machine program by the program manager computing device. The program manager 200 may be embodied in a computing device where it is an engine responsible for managing the operations for generating the machine program 220. The machine program 220 may be a sequence of steps for the machining of workpieces on a CNC machine. In one exemplary embodiment, the program manager 200 may generate the machine program and prior to programming of the machine operations, a user may specify the initial setup 230. The program manager 200 may then read and write setup data through a Setup Change Handler component 250. In some embodiments, a setup 240 may be divided into two sections, the part setup and the machine setup.

The part setup may comprise the definition of the workpieces where a workpiece is the association of a part and stock. The part may be the target state of the workpiece and the stock may be the initial state of the workpiece. By and large, the part is the target model to machine. That is, the stock may define the pieces of material in which the part will be cut. A part may be cut from an assembly of stocks where several parts and stocks may define a single workpiece. Part instances represent repetitions of the part in the workpiece. The program manager may use part instances to repeat the operations of the part where instances are located.

A machine setup is the configuration of the machine at a certain time in the program. The machine setup specifies the machine being programmed. In some embodiments, the machine may be a representation of the CNC machine where it may comprise two main modules: a kinematic definition and a controller definition. The kinematic module defines the possible motions of the machine and describes the constitutive components of the machine. The controller module may define what can be controlled and how things may be controlled through the machine program.

In one embodiment, the machine setup may also define workpiece instances and, by extension, part occurrences. A workpiece instance is an instance of the workpiece that is mounted on the machine. A workpiece may have multiple instances mounted on the machine. A part occurrence represents an occurrence of the part in a workpiece mounted on the machine. Part occurrences may depend on the workpiece instances and the part instances inside a workpiece. The machine setup may include other information that may not be relevant for the programming.

In another embodiment, prior to creation of the operations, a CAM system may have machining features in the document database. A machining feature is an input necessary to the operation creation. It may describe the shape to machine and it characterizes the shape with machining properties. All features of the database reference a part of the part setup. The program manager may create part operations 211 when applying machining strategies on machining features. The part operation 211 is a high-level representation of the machining operation that abstracts the machine level. A part operation has no time or spatial localization on the machine. Part operations may also comprise a tool path where the tool path is the tool trajectory calculated for the operation.

In one embodiment, the sequence of operations occurring on a part is the part operation list. The operation order may, for example, define the order that operations have to occur within the life of a workpiece. In one exemplary embodiment of the machine program, the order of the operations occurring on a part occurrence cannot violate the order of the part operation list. On creation of the part operations, the program manager intelligently creates the machine operations 221. A machine operation 221 is an instance of a part operation 211 on the machine. The machine operation may define where and when the process occurs on the machine. The program manager may create a machine operation for each part occurrence.

The sequence of operations occurring on the machine is the machine operation list. The machine operation list may be considered a view of the machine program 220. The operation order corresponds to the order in time that operations occur on the machine. The machine operation list may also include tool changes 222, links 223, and synchronizations 224. An exemplary machine may use cutting tools to remove material. An operation may use a cutting tool where a tool change 222 may be the event between two machine operations that are using different cutting tools. On the machine, such events may trigger a sequence of instructions that changes the active tool. In one embodiment, a link 223 is a transition move between channel items of a program. A channel item may be a machine operation, a tool change, a start of the program or an end of the program. The link calculator is the engine responsible for calculating safe and efficient transition between channel items.

Some exemplary machines may allow for programming of several sequences of instructions in parallel. A flow of instruction is a channel. A program may drive multiple channels, for example, a machine with two channels allows commanding of two tools simultaneously, resulting in a faster material removal. In an embodiment utilizing multiple channels, a synchronization 224 event may define a time where channel execution is synchronized. That is, a synchronization 224 event may be across at least two channels. The position of a synchronization event in a channel is called a sync node. The sync nodes of a synchronization event represent the same time in the program. During execution of the program on the machine, the machine may execute instructions sequentially until it reaches a sync node. On a sync node, execution pauses until other channels affected by the synchronization event reach the same sync node. All channels restart together after all sync nodes have been reached.

Figure 3:
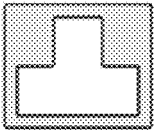
FIG. 3 depicts a series of exemplary workpiece scenarios.
Figure 3:
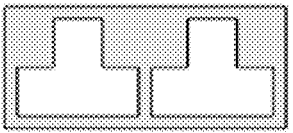
Figure 3:
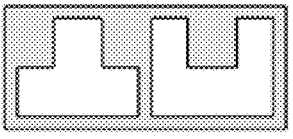
Figure 3:
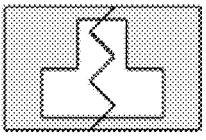

FIG. 3 depicts a series of exemplary workpiece scenarios where a part and a stock are illustrated as making up a workpiece. In one embodiment of an exemplary program manager, a workpiece may have different scenarios. For example, the workpiece may comprise one part and one stock; the workpiece may comprises two instances of the same part and one stock; the workpiece may comprise two different parts and one stock; and the workpiece may comprise one part and two stocks.

Figure 4:
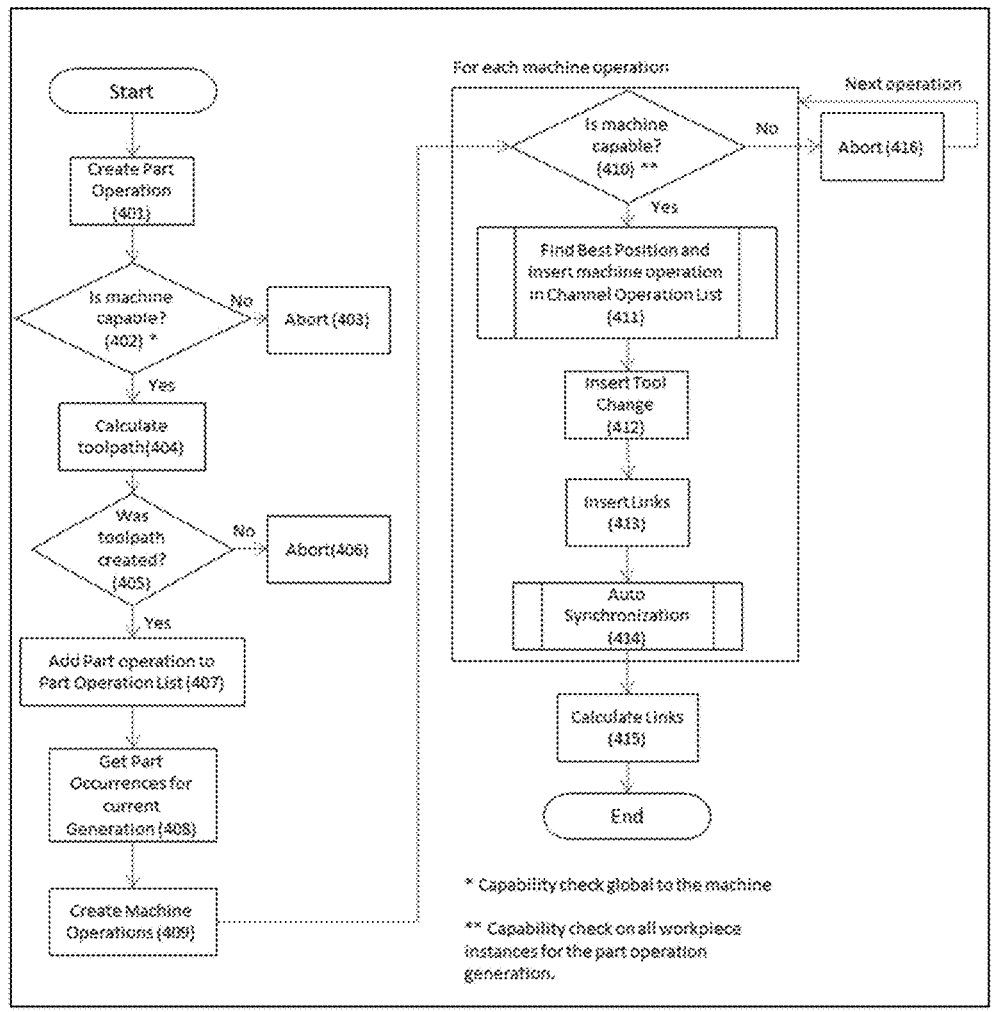
FIG. 4 depicts, in a top-level flowchart, an exemplary method of the creation of part operations and machine operations.

FIG. 4 depicts, in a top-level flowchart, an exemplary embodiment of the present invention showing the creation of part operations and machine operations by the program manager computing device. The exemplary steps of the program manager computing device may comprise the following steps: (a) applying a machining strategy to a machining feature and creating a part operation but not inserting it to the part operation list yet (step 401); (b) determining a machine capability where the machine capability may be the capability of the machine to perform a machining process (step 402); (c) if the machine is not capable, the program manager may not generate the operation (step 403). An example of a scenario where the machine is not capable may be a machine equipped with two tables, and where table 1 is milling only and table 2 is able to spin to perform turning operations. The machine is turning capable but turning is possible only if the workpiece is on table 2. Accordingly, this first capability check may be global to the machine.

The program manager may then continue with the steps of: (d) requesting a calculation of a toolpath from an outside component (step 404); (e) if the calculation is successful, then the component returns the toolpath (step 405); (f) if the calculation is not successful, then the operation creation is aborted (step 406); (g) inserting the part operation in the part operation list at the user specified location and at this point, the part operation creation is completed (step 407); (h) receiving a set of part occurrences for the current setup where the part occurrences are returned by the component setup handler (FIG. 2, 250) of the program manager (step 408); (i) creating a machine operation for each part occurrence, however the machine operations may not be inserted in the machine operation list at this point (step 409); (j) checking the capability of the machine based on the machine kinematic chain, where the machine kinematic is a portion of the kinematic tree of the machine (step 410). In one embodiment, the machine kinematic may describe all the axes involved in an operation. That is, each machine operation may refer to a kinematic chain where the kinematic chain may start from the workpiece and end with the cutting tool. Accordingly, the machine is determined to be capable if axes of the kinematic chain are able to perform all the motions of the part operation toolpath. Alternatively, if the machine is not capable of performing the machine operation, the machine operation is not created and the program manager goes to the next machine operation (step 416).

The program manager may then continue with the steps of: (k) finding an insertion position based on valid insertion areas, and inserting the machine operation in a channel machine operation list (illustrated with greater detail in FIG. 5) (step 411); (l) inserting a tool change item before the new machine operation, if the previous machine operation of the channel is using a different tool, for example, a tool change item may be inserted after the new machine operation if the next operation of the channel is using a different tool (step 412); (m) adding link items before and after the new machine operation and before and after any tool change item is inserted in the previous step (step 412), and optionally, the links are not calculated at this point (step 413); (n) executing an automatic synchronization where the automatic synchronization is a process that automatically adds sync to the program (illustrated with greater detail in FIG. 6) (step 414). The automatic synchronization may avoid violation of the part operation list. That is, machine operation cannot start before the previous operation in the part operation list. Optionally, automatic synchronization may also avoid invalid machining scenarios for a machine with multiple channels. Two operations may have to be compatible in order to occur simultaneously. Operations are compatible if they do not send contradictory commands simultaneously. Additionally, the program manager may then continue with the step of (o) notifying external components, e.g., the link calculator, that link calculation may start once all channel items have been added to the machine program (step 415). Accordingly, the machine program may be ready once the link calculation is complete.

Figure 5:
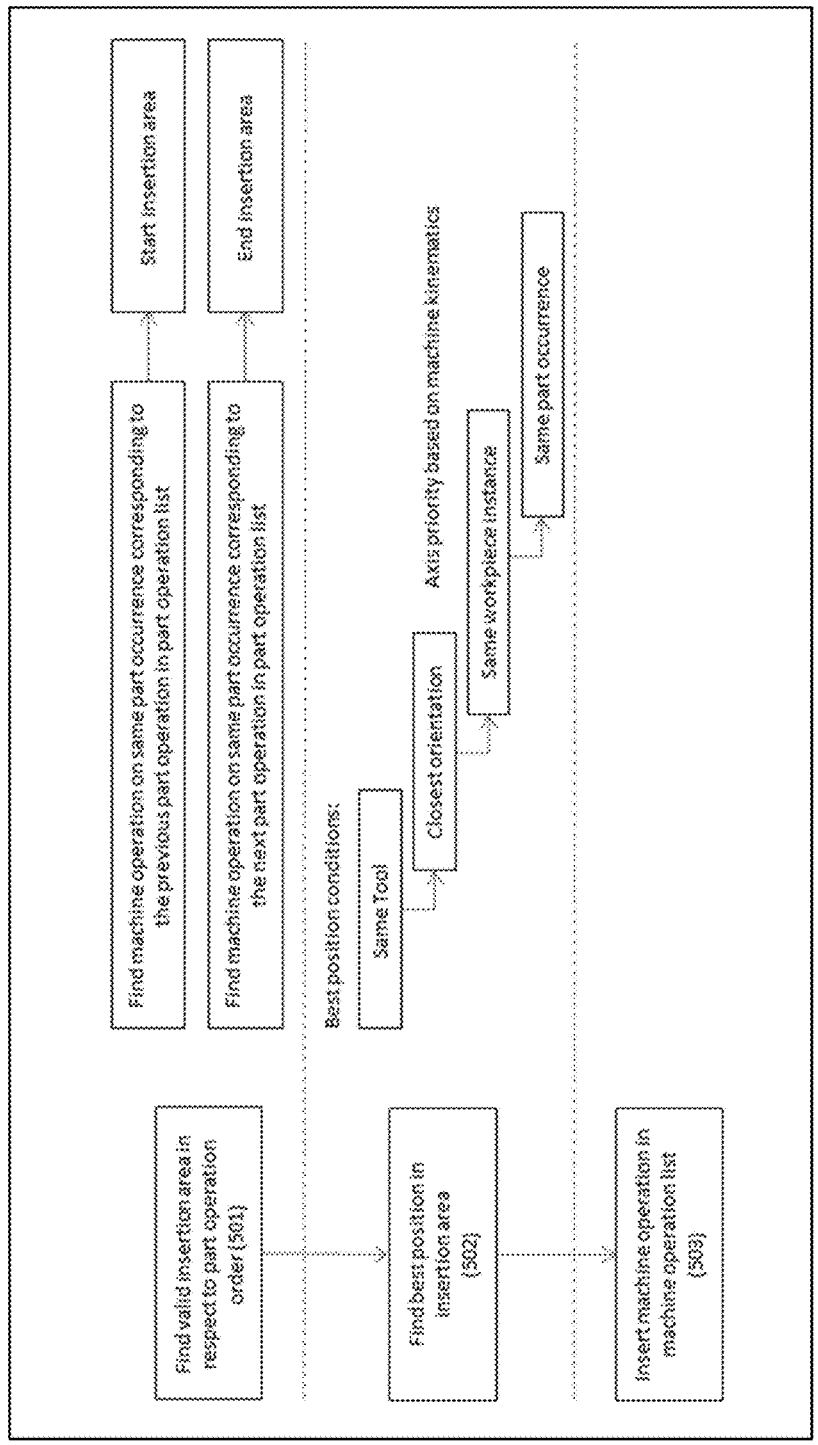
FIG. 5 depicts, in a top-level flowchart, an exemplary method of finding the best position in order to insert machine operations.

FIG. 5 further depicts, in a top-level flowchart, the step of finding the best position in order to insert machine operations. In one embodiment, in order to find the best position, the program manager may first look for the valid insertion area in the machine program channel of the created operation (step 501). A valid insertion area starts after the previous operation occurring on the same part occurrence and that belongs to the same channel. The valid insertion area ends before the next operation occurring on the same part occurrence and that belongs to the same channel. Once a valid insertion area is determined, the program manager may look for the best insertion position within the valid insertion area (step 502). The program manger may then first look for an operation using the same tool, then it may look at minimizing the orientation change, i.e., minimize rotary axis motion, then the program manager may look for the operation on the same workpiece instance and then it may look for operation on the same part occurrence. Once the best insertion position is determined, the operation is inserted in the channel machine operation list (step 503).

Figure 6:
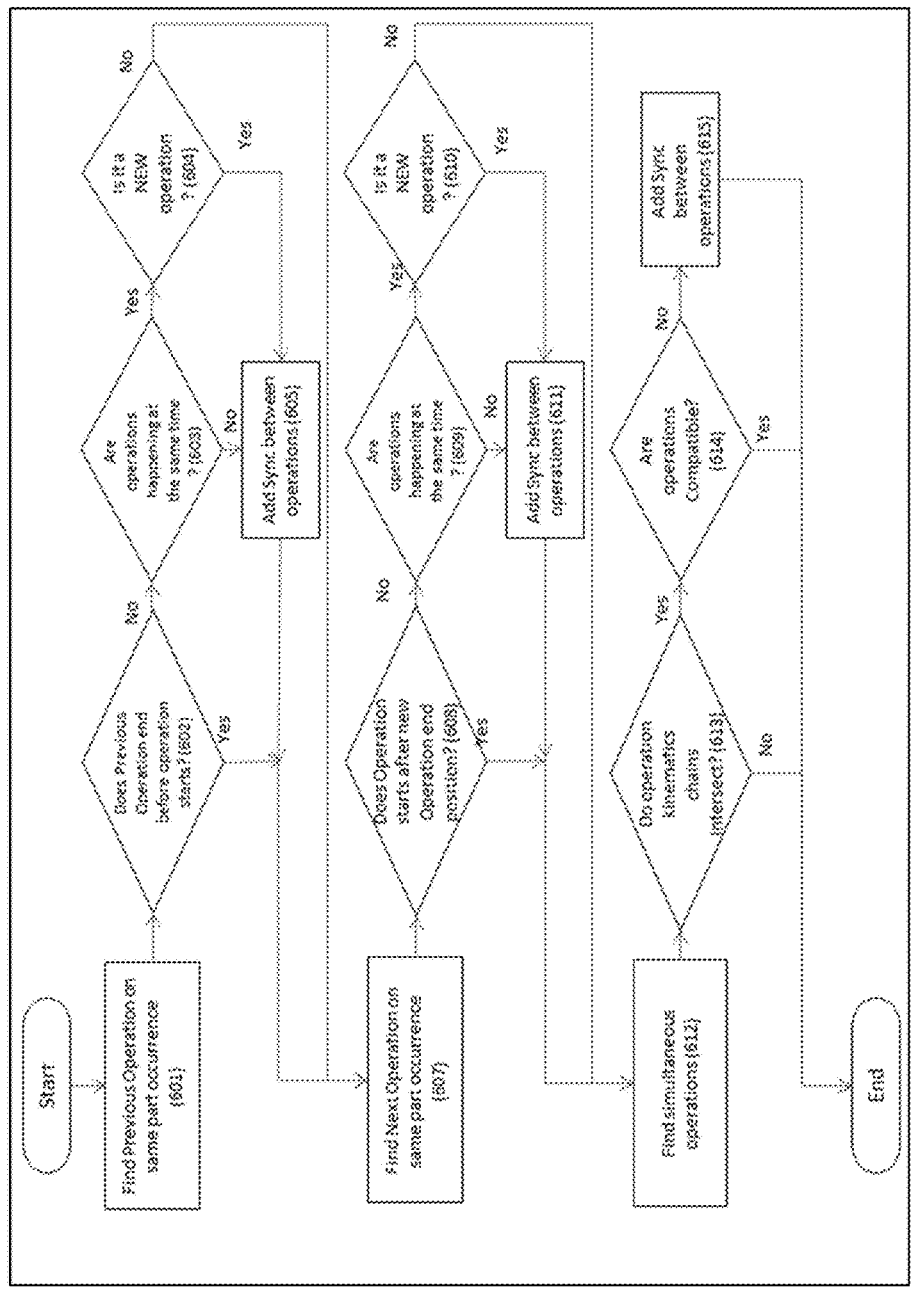
FIG. 6 depicts, in a top-level flowchart, an exemplary method of executing an automatic synchronization event.

FIG. 6 depicts, in a top-level flowchart, an exemplary embodiment of the program manager executing an automatic synchronization event. The program manager may search for previous operations on the same part occurrence (step 601). The search may not be limited to the operation's channel; and the program manager may look for the operation in all the channels. If the previous operation ends before the new operation starts (step 602), then processing may continue with the next step (step 607) otherwise, the program manager may test to determine if operations are simultaneous in time (step 603). If they are not, a synchronization event is added between the two channels to prevent violation of the part operation order (step 605). If operations are simultaneous (step 604), synchronization is added on creation of a new operation (step 605). In an embodiment where the user edited the program to force a simultaneous scenario, the synchronization is not added.

Additionally, the program manager may search in all the channels for the next operation occurring on the same part occurrence (step 607). If the next operation starts after the new operation ends (step 608) then it continues with the next step (step 612), otherwise, the program manager may test to determine if the operations are simultaneous in time (step 609). If they are not, a synchronization event is added between the two channels to prevent violation of the part operation order (step 611). If the operations are simultaneous (step 610), synchronization is added on creation of a new operation (step 611). If the user edited the program to force a simultaneous scenario, then synchronization is not added. This behavior creates a program "overly" safe on creation; it is considered safe practice with multi-channel machines. On the next step (step 612), the program manager may search for simultaneous operations in other channels. Operations may be on different part occurrences. If simultaneous machine operations have intersecting kinematics chains (step 613), the program manager may test to determine if operations are compatible (step 614). In case of incompatibility, a synchronization event may be added (step 615) to prevent operations to occur at the same time.

Setup Change Handler

In one embodiment, the machine setup may change during a program. Machine setup changes if machine configuration changes or if a workpiece is relocated. A workpiece transfer is a particular case of a machine setup change that is characterized by the relocation of a workpiece. A workpiece split is the event where the workpiece is cut into multiple pieces. New pieces may be dropped or might be kept for further programming. In an embodiment of the program manager, the setup change handler may be responsible for detecting when a setup change has happened. Setup changes may happen in any of the following exemplary scenarios: (a) a manual setup change operation is programmed; transfer is optional with the manual setup change; (b) workpiece is held because of a previous pickup operation and the workpiece is split by a cutting operation; this may be a transfer scenario; (c) workpiece is relocated with a sequence of Pickup and Release operations; this may also be a transfer scenario.

When a workpiece transfer is programmed, typically a program start and program end may be overlapped. Overlap is possible as long as operations are not interfering with each other. In case of a parallel machining process, the program start and program end may overlap. Without overlap, the program is qualified as a sequential machining process. A sequential machining process, in most cases, is treated differently than a parallel programming process. A parallel machining process may be used whenever it is possible, since it saves machining time. In an embodiment of a parallel machining process, two instances of the same workpiece coexist at the same time but the two instances correspond to different generations of the workpiece. In some embodiments, an editable property on the program may define the machining process type as either: Parallel or Sequential. Typically, the machining process type is based on a user input.

Figure 7:
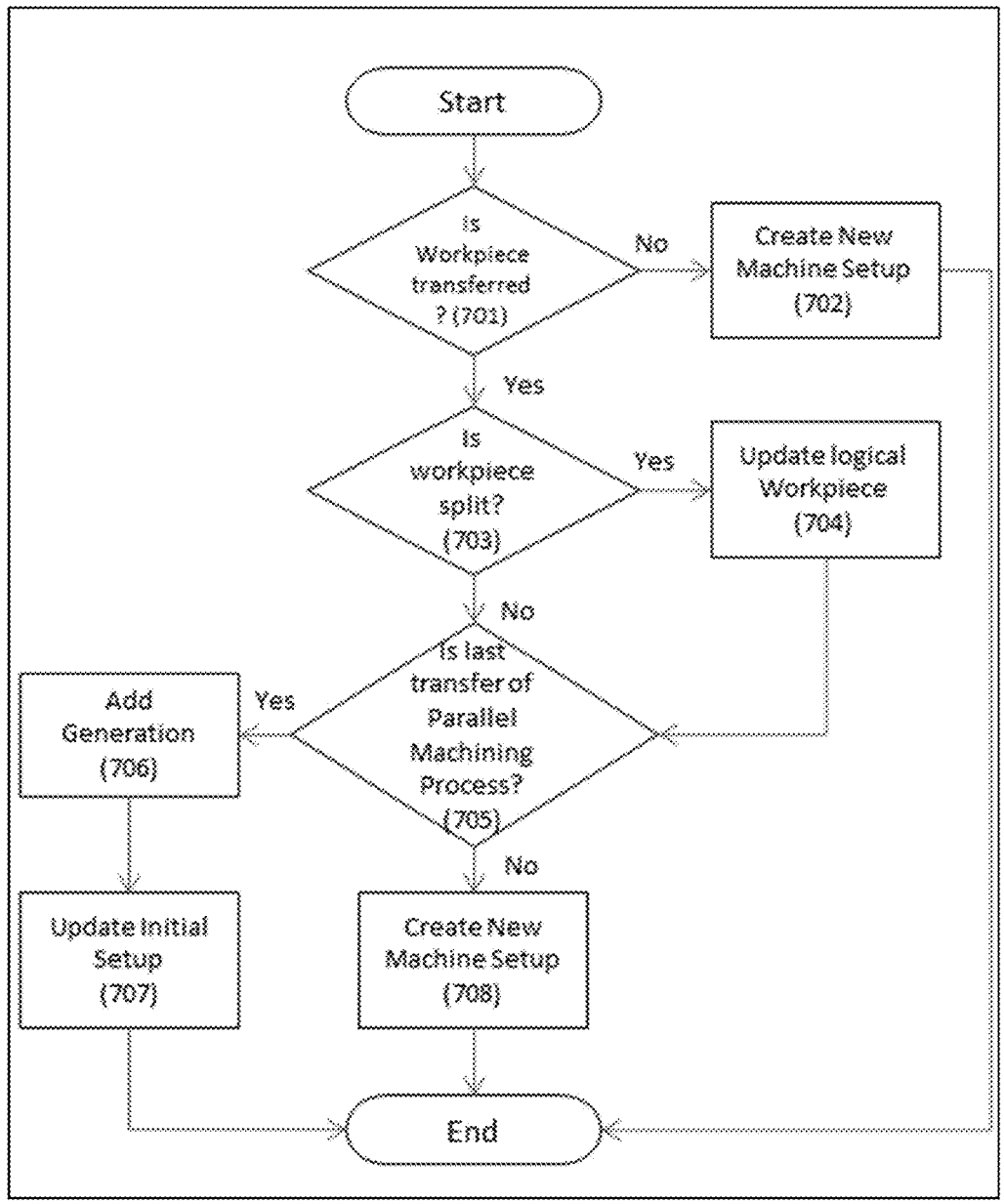
FIG. 7 depicts an exemplary embodiment of a setup change on the machine.

FIG. 7 depicts, in a top-level flowchart, a setup change on the machine. If a workpiece is not transferred (step 701), a new machine setup is created with an updated data (step 702). If a transfer occurs and the workpiece is split (step 703) then the setup change handler may create the new workpieces in the part setup and update the logical workpiece (step 704). If the transfer is the last transfer of a parallel machining program (step 705) then the setup change handler may create a new generation (step 706). Then the setup change handler may modify the initial setup via updating the initial setup (step 707) and adding the workpiece instance and the part occurrence for the new generation. If the transfer is not the last transfer then the setup change handler may generate a new machine setup for the program (step 708). The program manager may create machine operations for all part occurrences of the current generation of the part.

Figure 8:
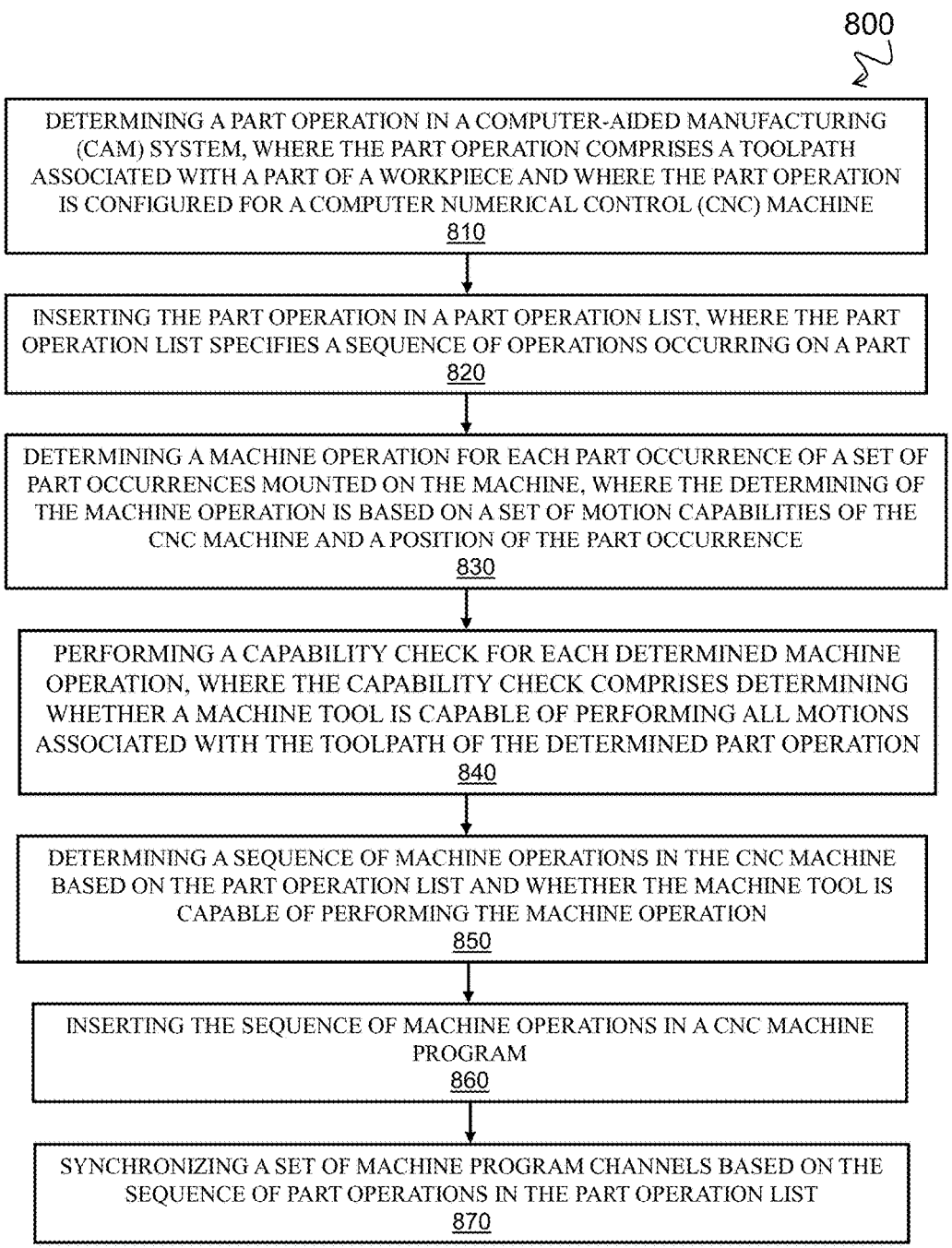
FIG. 8 depicts, in a top-level flowchart, an exemplary method of determining a machining process.

Embodiments may include an exemplary method of determining a machining process 800, as illustrated in a top-level flowchart of FIG. 8. The exemplary steps of the program manager computing device may comprise the following steps: (a) determining a part operation in a computer-aided manufacturing (CAM) system, where the part operation comprises a toolpath associated with a part of a workpiece and where the part operation is configured for a computer numerical control (CNC) machine (step 810); (b) inserting the part operation in a part operation list, where the part operation list specifies a sequence of operations occurring on a part (step 820); (c) determining a machine operation for each part occurrence of a set of part occurrences mounted on the machine, where the determining of the machine operation is based on a set of motion capabilities of the CNC machine, a position of the part occurrence, and the associated part operation (step 830); (d) performing a capability check for each determined machine operation, where the capability check comprises determining whether a machine tool is capable of performing all motions associated with the toolpath of the determined part operation (step 840); and (e) determining a sequence of machine operations in the CNC machine based on the part operation list and whether the machine tool is capable of performing the machine operation (step 850). Optionally, the method may further include: (f) inserting the sequence of machine operations in a CNC machine program (step 860); and (g) synchronizing a set of machine program channels based on the sequence of part operations in the part operation list. (step 870).

Figure 9:
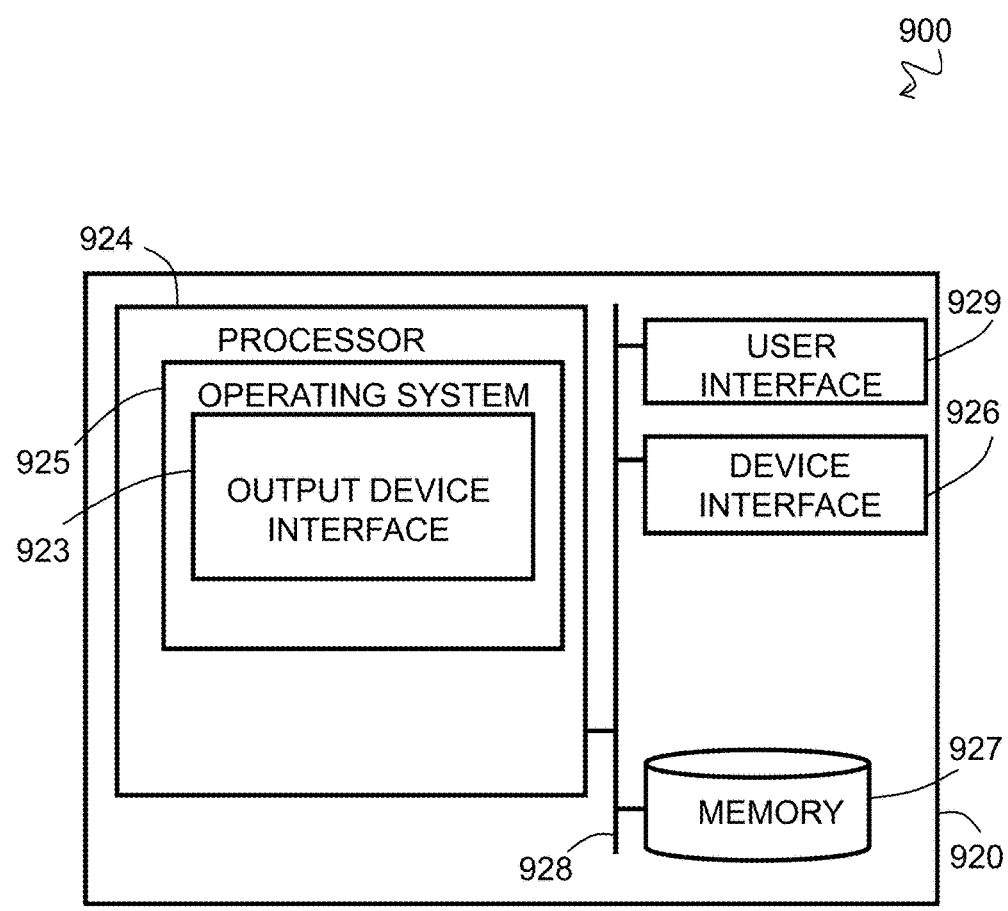
FIG. 9 depicts an exemplary top level functional block diagram of a computing device embodiment.

FIG. 9 illustrates an exemplary top level functional block diagram of a program manager computing device embodiment 900. The exemplary operating environment is shown as a computing device 920 comprising a processor 924, such as a central processing unit (CPU), addressable memory 927, such as a lookup table, e.g., an array, an external device interface 926, e.g., an optional universal serial bus port and/or related processing, and/or an Ethernet port and related processing, an output device interface 923, and an optional user interface 929, e.g., an array of status lights, and one or more toggle switches, and/or a display, and/or a keyboard, and/or a pointer-mouse system, and/or a touch screen. Optionally, the addressable memory may, for example, be: flash memory, SSD, EPROM, and/or a disk drive and/or another storage medium. These elements may be in communication with one another via a data bus 928. An operating system 925, such as one supporting an optional web browser and applications, may be configured to, via the processor 924, execute steps of a program manager computing device of a CAM system configured to determine a machining process for the CNC machine of the CAM system based on whether the machine tool is capable of performing the part operation and the machine operation.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described.

What is claimed is:

1. A method comprising:
   determining a part operation in a computer-aided manufacturing (CAM) system, wherein the part operation comprises a toolpath associated with a part of a workpiece and wherein the part operation is configured for a computer numerical control (CNC) machine;
   inserting the part operation in a part operation list, wherein the part operation list specifies a sequence of operations occurring on a part;
   determining a machine operation for a channel for each part occurrence of a set of part occurrences mounted on the machine, wherein the determining of the machine operation is based on a set of motion capabilities of the CNC machine, a position of the part occurrence, and the associated part operation;
   performing a capability check for each determined machine operation, wherein the capability check comprises determining whether a machine tool is capable of performing all motions associated with the toolpath of the determined part operation;
   performing a search for simultaneous machine operations in other channels, wherein if the machine operations across different channels are not compatible, a notification is sent to other components of the CAM system, wherein the notification comprises when a recalculation of transition movement and intermediate stock generation is to occur; and
   determining a sequence of machine operations in the CNC machine based on the part operation list, the notification, and whether the machine tool is capable of performing the machine operation.

2. The method of claim 1 further comprising:
   inserting the sequence of machine operations in a CNC machine program; and
   synchronizing a set of machine program channels based on the sequence of part operations in the part operation list.

3. The method of claim 2 wherein the synchronizing prevents incompatible simultaneous machine operations from occurring on the CNC machine.

4. The method of claim 2 further comprising:
   synchronizing a set of machine program channels based on the sequence of part operations in the part operation list wherein the synchronizing avoids violation of the part operation list and invalid machining scenarios for a machine with multiple channels.

5. The method of claim 4 wherein the synchronizing to avoid invalid machining scenarios for a machine with multiple channels comprises different part occurrences and if the different part occurrences are incompatible insert a synchronization event to prevent operations to occur at the same time.

6. The method of claim 1 wherein the determining a sequence of machine operations is further based on a set of rule constraints wherein the set of rule constraints is a set of optimization rules.

7. The method of claim 6 wherein the set of optimization rules is at least one of: a set of rules to minimize tool changes, a set of rules to minimize axis rotations, and a set of rules to minimize tool travel.

8. The method of claim 1 wherein the CNC machine program comprises at least one of: machine operations, tool changes, links, and synchronizations.

9. The method of claim 1 wherein inserting the part operation in the part operation list is inserted at a user specified location.

10. The method of claim 1 wherein inserting machine operations in the CNC machine program is based on a successful calculation of a toolpath.

11. The method of claim 1 wherein a kinematic chain associated with the CNC machine tool defines possible motions of the machine.

12. The method of claim 1 further comprising:
   determining a position and a number of instances of a set of part operations scheduled to occur on the CNC machine based on the part of the workpiece.

13. The method of claim 1 wherein the determining whether a machine tool is capable of performing all necessary motions for the toolpath of the determined part operation is based on whether axes of a kinematic chain are capable of performing all motions associated with the toolpath of the determined part operation.

14. A device comprising:
   a processor and addressable memory, the processor configured to:

determine a part operation in a computer-aided manufacturing (CAM) system, wherein the part operation comprises a toolpath associated with a part of a workpiece and wherein the part operation is configured for a computer numerical control (CNC) machine;

insert the part operation in a part operation list, wherein the part operation list specifies a sequence of operations occurring on a part;

determine a machine operation for a channel for each part occurrence of a set of part occurrences mounted on the machine, wherein the determining of the machine operation is based on a set of motion capabilities of the CNC machine, a position of the part occurrence, and the associated part operation;

perform a capability check for each determined machine operation, wherein the capability check comprises determining whether a machine tool is capable of performing all motions associated with the toolpath of the determined part operation;

perform a search for simultaneous machine operations in other channels, wherein if the machine operations across different channels are not compatible, a notification is sent to other components of the CAM system, wherein the notification comprises when a recalculation of transition movement and intermediate stock generation is to occur; and determine a sequence of machine operations in the CNC machine based on the part operation list, the notification, and whether the machine tool is capable of performing the machine operation.

15. The device of claim 14, wherein the processor is further configured to:

insert the sequence of machine operations in a CNC machine program; and synchronize a set of machine program channels based on the sequence of part operations in the part operation list, wherein the synchronization prevents incompatible simultaneous machine operations from occurring on the CNC machine.

16. The device of claim 12, wherein the processor is further configured to:

determine a position and a number of instances of a set of part operations scheduled to occur on the CNC machine based on the part of the workpiece.

17. The device of claim 14 wherein the determination of a sequence of machine operations is further based on a set of rule constraints wherein the set of rule constraints is a set of optimization rules and wherein the set of optimization rules is at least one of: a set of rules to minimize tool changes, a set of rules to minimize axis rotations, and a set of rules to minimize tool travel.

18. A computer-aided manufacturing (CAM) system comprising a program manager computing device, the program manager comprising:

a part operations module, wherein the part operations module comprises a processor and an addressable memory, the processor configured to:

determine a part operation in the CAM system, wherein the part operation comprises a toolpath associated with a part of a workpiece and wherein the part operation is configured for a computer numerical control (CNC) machine; and insert the part operation in a part operation list, wherein the part operation list specifies a sequence of operations occurring on a part; and a machine program module, wherein the machine program module comprises a processor and an addressable memory, the processor configured to:

determine a machine operation for a channel for each part occurrence of a set of part occurrences mounted on the machine, wherein the determining of the machine operation is based on a set of motion capabilities of the CNC machine, a position of the part occurrence, and the associated part operation;

perform a capability check for each determined machine operation, wherein the capability check comprises determining whether a machine tool is capable of performing all motions associated with the toolpath of the determined part operation;

perform a search for simultaneous machine operations in other channels, wherein if the machine operations across different channels are not compatible, a notification is sent to other components of the CAM system, wherein the notification comprises when a recalculation of transition movement and intermediate stock generation is to occur; and determine a sequence of machine operations in the CNC machine based on the part operation list, the notification, and whether the machine tool is capable of performing the machine operation.

19. The CAM system of claim 18, further comprising:

a setup change handler module, wherein the setup change handler module comprises a processor and an addressable memory, the processor configured to:

receive the sequence of part operations in the part operation list from the part operations module; and synchronize a set of machine program channels based on the received sequence of part operations in the part operation list, wherein the synchronization prevents incompatible simultaneous machine operations from occurring on the CNC machine.

20. The CAM system of claim 19, wherein the machine program module is further configured to:

insert the sequence of machine operations in a CNC machine program.

* * * * *